Patented Apr. 9, 1929.

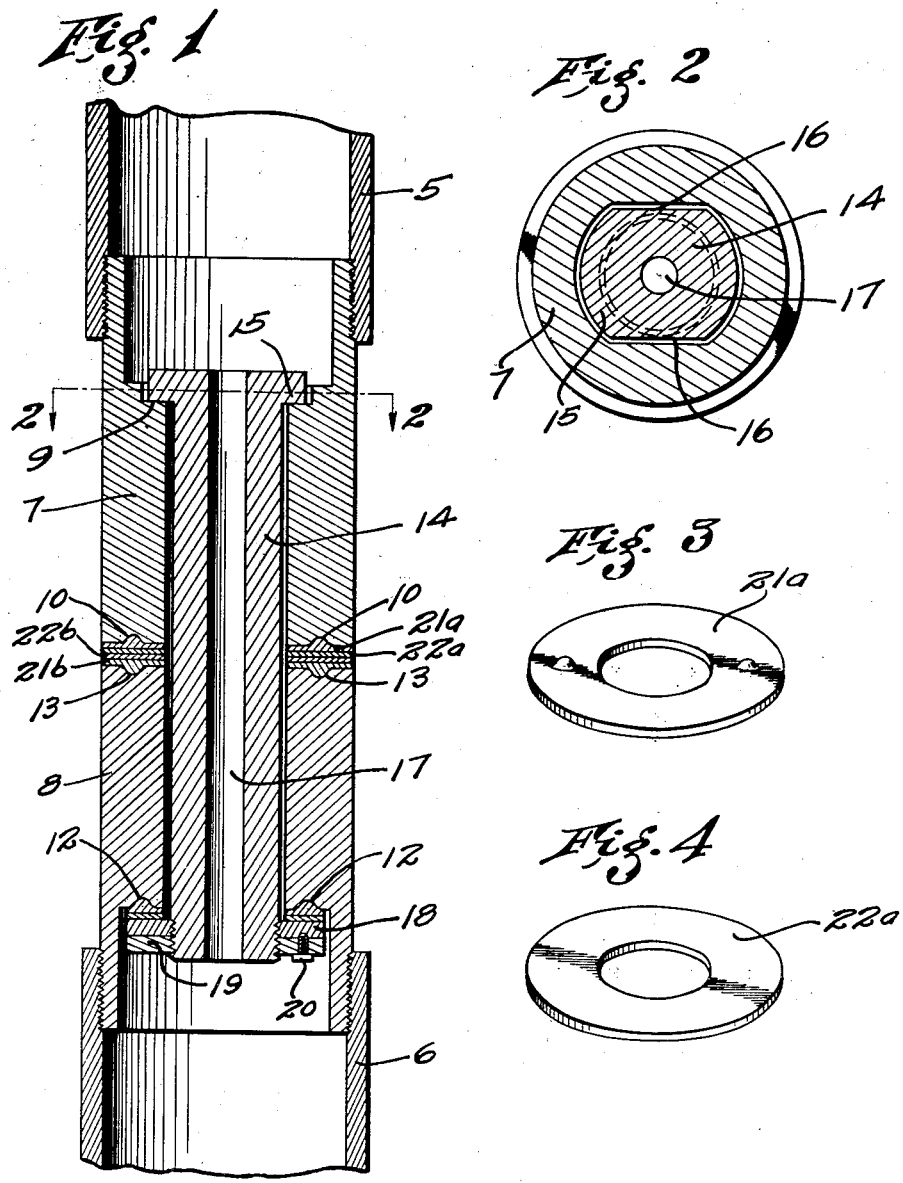

1,708,378

UNITED STATES PATENT OFFICE.

CLARENCE R. DALE, OF LOS ANGELES, CALIFORNIA, ASSIGNOR OF ONE-THIRD TO LESTER C. NIELSON, OF LOS ANGELES, CALIFORNIA, AND ONE-THIRD TO AUGUST R. MAIER, OF TORRANCE, CALIFORNIA.

ROTARY FRICTION COUPLING.

Application filed April 9, 1928. Serial No. 268,458.

This invention relates to a coupling adapted for insertion in a rotary driving line. The present invention may be applied to rotary drill pipes such as are used in oil well drilling, but is capable of embodiment in many different devices.

The objects of this invention have been to provide a yieldable rotary coupling having any or all of the following features; first, to provide a coupling which will yield when the rotary line is subjected to a predetermined torsional stress so as to permit rotary slippage; second, to provide a coupling which will hold the line against parting longitudinally even though rotary slippage occurs and having parts bearing the longitudinal strain; third, to provide a coupling having a passage for circulation; and fourth, to provide a coupling which is compact, of few parts, readily assembled and disassembled, strong and durable, easily manipulated and adjusted.

In addition to these objects, there are other objects incidental to the structure disclosed herein and an embodiment of which is illustrated in the accompanying drawing, in which:—

Fig. 1 is a longitudinal section through a coupling disposed in a drill string, fragments of the coupled joints of drill pipe being shown; Fig. 2 is a section as seen on the line 2—2 of Fig. 1; and Figs. 3 and 4 are perspective views of the friction disks or rings.

Referring with more particularity to the drawing, 5 and 6 mark joints of drill pipe which are coupled together by my improved device. The joints of pipe are internally threaded and receive a divided sleeve comprising sections 7 and 8. The sleeve at its upper end is counterbored to provide a shoulder 9. In the face of the section 7 opposite the section 8 are cavities 10. The section 8 has a counterbore to provide a shoulder and cavities 12 are provided therein. In the face of section 8 contiguous to section 7 are cavities 13.

A bolt 14 links the sections together. It is disposed in the bore of the sleeve and has a flange head 15 at its upper end. This head may have flat sides 16 corresponding to flat portions of its counterbore, as best shown in Fig. 2. Section 7 and the bolt when in position, are held against relative rotation. Extending through the bolt is a passage 17 for circulation fluid which is commonly used in rotary drilling. At the lower end of the bolt an external thread is provided for mounting thereon an adjustable flange 18. This flange may be locked in position by a nut 19 and a set screw 20.

Interposed between the contiguous faces of sections 7 and 8 are friction rings or washers. There are four shown herein, but any number found expedient may be used. The outside washers indicated by $21^a$ and $21^b$ are similar each having projections which fit into the corresponding cavities 10 and 13, so as to hold these rings against rotation with respect to the sections. Between the friction rings $21^a$ and $21^b$ are friction rings $22^a$ and $22^b$ of like structure, one of the rings being shown in Fig. 4. I have also interposed between the flange 18 and the shoulder on section 8 a friction ring corresponding to friction ring $21^a$ and a friction ring corresponding to ring $22^a$.

It is obvious that the flange 18 may be adjusted to obtain the desired pressure between the friction rings so as to provide for a rotative yieldable coupling between the sleeve sections. The link bolt prevents longitudinal separation of the sleeve, and carries the weight of the string.

In oil well drilling, the tools being rotated often encounter obstructions and bind, so that an excessive torsional strain is placed upon the drill string. This often causes breakage and parting of the string with resultant damage and interference with the work, well known in the art of oil well drilling. With my improved construction, the coupling may be adjusted so that at a predetermined torsional stress, there is a rotary slippage, thereby preventing damage to the drill string and parting.

What I claim is:—

1. A coupling for rotary lines comprising a transversely divided sleeve, friction rings interposed between the contiguous sections of said sleeve, a link bolt disposed within the bore of said sleeve and having lateral extensions bearing against said sleeve and coupling the sections of the latter against longitudinal separation, and means to axially adjust one of said extensions to vary the bearing pressure and thereby the frictional resistance of said rings.

2. A coupling for tubular rotary lines comprising a transversely divided sleeve, friction rings interposed between the contiguous sections of said sleeve, a tubular link bolt disposed within the bore of said sleeve and having lateral extensions bearing against said sleeve and coupling the sections of the latter against longitudinal separation, and means to axially adjust one of said extensions to vary the bearing pressure and thereby the frictional resistance of said rings.

3. A coupling for rotary lines comprising a transversely divided sleeve having oppositely faced lateral shoulders at the ends, friction rings interposed between the contiguous sections of said sleeves, a link bolt disposed within the bore of said sleeve and spanning the line of separation, said bolt having a lateral flange at one end bearing against a corresponding shoulder in a sleeve section and an axial adjustable flange at the other end bearing against the other shoulder whereby to adjust the frictional resistance of said rings.

4. A coupling for tubular rotary lines comprising a transversely divided sleeve having oppositely spaced lateral shoulders at the end, friction rings interposed between the contiguous sections of said sleeve, a tubular link bolt disposed within the bore of said sleeve and spanning the line of separation, said bolt having a lateral flange at one end bearing against the corresponding shoulder in a sleeve section, and an axially adjustable flange at the other end bearing against the other shoulder whereby to adjust the frictional resistance of said ring.

5. A coupling for rotary lines comprising a transversely divided sleeve, a plurality of friction rings interposed between the contiguous sections of said sleeve, the outer rings having projections intruding into corresponding cavities in said sleeve sections to lock them to said sections, a link bolt extending through the bore of said sleeve and having flanges bearing against said shoulders to couple said sleeve against longitudinal separation, one of said flanges being longitudinally adjustable whereby to adjust the frictional resistance of said rings and to provide a rotative yieldable connection between the sections of said sleeve.

6. A coupling for tubular rotary lines comprising a transverse divided sleeve having oppositely spaced lateral shoulders, a plurality of friction rings interposed between the contiguous sections of said sleeve, the outer rings having projections intruding into corresponding cavities in said sleeve sections to lock them to said sections, a tubular link bolt extending through the bore of said sleeve and having flanges bearing against said shoulders to couple said sleeve against longitudinal separation, one of said flanges being longitudinally adjustable whereby to adjust the frictional resistance of said rings and to provide a rotative yieldable connection between the sections of said sleeve.

7. A coupling for a rotary drill pipe comprising a transversely divided sleeve having oppositely faced internal lateral shoulders, a plurality of friction rings, interposed between the contiguous sections of said sleeve, the outer rings having projections intruding into corresponding cavities in said sleeve sections to lock them to said sections, a tubular link bolt extending through the bore of said sleeve and having flanges bearing against said shoulders to couple said sleeve against longitudinal separation, one of said flanges being longitudinally adjustable whereby to adjust the frictional resistance of said rings and to provide a rotative yieldable connection between the sections of said sleeve, and friction rings interposed between one of said flanges and its shoulder.

8. A coupling for tubular rotary lines comprising a transversely divided sleeve having a tubular longitudinally extending link within the bore of said sleeve and coupling the sections of the latter against longitudinal separation but enabling relative rotation, said link providing a passage for circulation fluid and a yieldable connection interposed between the sections of said sleeve for rotative coupling of the latter.

9. A coupling for tubular rotary lines comprising a transversely divided sleeve having a longitudinally extending link within the bore of said sleeve coupling the sections against longitudinal separation but enabling relative rotation, said link providing a passage for circulation fluid, and friction rings interposed between the sections of said sleeve for rotative yielding coupling of the latter.

10. A coupling for tubular rotary lines comprising a transversely divided sleeve having a longitudinally extending tubular link within the bore of said sleeve coupling the sections against longitudinal separation but enabling relative rotation, said link providing a passage for circulation fluid, friction rings interposed between the sections of said sleeve for rotative yielding coupling of the latter, and means to adjustably vary the bearing pressure between said sections and thereby the frictional resistance of said rings.

In witness that I claim the foregoing I have hereunto subscribed my name this 20th day of March, 1928.

CLARENCE R. DALE.